(12) United States Patent (10) Patent No.: US 9,135,043 B1
Srinivasan et al. (45) Date of Patent: Sep. 15, 2015

(54) INTERFACE FOR ENABLING AN APPLICATION IN A VIRTUAL MACHINE TO ACCESS HIGH PERFORMANCE DEVICES

(75) Inventors: Kiran Srinivasan, Sunnyvale, CA (US); Timothy C. Bisson, Fremont, CA (US)

(73) Assignee: NetApp, Inc., Sunnyvale, CA (US)

( * ) Notice: Subject to any disclaimer, the term of this patent is extended or adjusted under 35 U.S.C. 154(b) by 977 days.

(21) Appl. No.: 12/892,420

(22) Filed: Sep. 28, 2010

(51) Int. Cl.
*G06F 9/455* (2006.01)
(52) U.S. Cl.
CPC .................................. *G06F 9/45558* (2013.01)
(58) Field of Classification Search
None
See application file for complete search history.

(56) References Cited

U.S. PATENT DOCUMENTS

| 2008/0222309 A1* | 9/2008 | Shanbhogue | 709/250 |
| 2009/0183180 A1* | 7/2009 | Nelson | 719/319 |
| 2011/0153909 A1* | 6/2011 | Dong | 711/6 |

* cited by examiner

*Primary Examiner* — Gregory A Kessler
(74) *Attorney, Agent, or Firm* — Perkins Coie LLP

(57) ABSTRACT

A high-performance device interface (HPDI) provides flexible and high-performance access by applications residing in a Virtual Machine (VM) to high-performance devices. The technique enables VM applications to use a single interface even when multiple device drivers exist, and can pass data efficiently between a VM application and a front-end device driver (a device driver implemented in a VM, such as may be used in a paravirtualization environment). It improves overall performance of a VM by reducing the copying of data during communications between a VM application and a front-end device driver, which reduces processor and memory usage.

30 Claims, 8 Drawing Sheets

# INTERFACE FOR ENABLING AN APPLICATION IN A VIRTUAL MACHINE TO ACCESS HIGH PERFORMANCE DEVICES

FIELD OF THE INVENTION

At least one embodiment of the present invention pertains to virtualization systems, and more particularly, to an interface for enabling an application in a virtual machine to access high performance devices.

BACKGROUND

Virtualization is commonly used today to improve the performance and utilization of multi-core/multi-processor computer systems. In a virtualization environment, multiple virtual machines share the same physical hardware, such as processors/cores, memory and input/output (I/O) devices. A software layer called a hypervisor typically provides the virtualization, i.e., virtualization of physical processors, memory and peripheral devices. This technique thereby enables the sharing of hardware by multiple virtual machines.

A virtual machine can provide a complete system platform which supports the execution of a complete operating system. One of the advantages of virtual machine environments is that multiple operating systems (which may or may not be of the same type) can coexist on the same physical platform. In addition, a virtual machine can have an architecture that differs from that of the physical platform in which is implemented.

One problem often associated with virtualization environments is that there is no interface by which an application in a virtual machine can access high-performance (high-speed) devices at their native (or optimum) speed. In this context, high-performance devices may include, for example, network communication adapters such as Ethernet adapters and small computer system interface (SCSI) devices such as disk drives. This is in contrast with, for example, integrated drive electronics (IDE) devices, which in comparison to the aforementioned devices generally are relatively low-performance devices.

The cause of this problem is that the application does not have direct access to the device driver software within the virtual machine; there are several layers of software between them. This architecture has the advantage of enabling device-specific details to be hidden from the user space. However, because the application and the device driver may not be able to map each other's address spaces, they may not be able to share data with each other. In that case, communication of data between the application and the device driver involves making several copies of the data as it propagates through the various software layers (since the application and the device driver do not have any context about each other, yet data consistency needs to be preserved). Consequently, this process undesirably consumes additional CPU cycles to propagate the data through the various layers. Further, due to this copying, the data that reaches the destination software layer (i.e., the application or the device driver, depending on the direction of communication) often ends up on a completely different memory page from where it started at the source software layer (i.e., the device driver or the application), which is an inefficient use of memory.

In a particular implementation, a common problem associated with virtualization environments that provide device access via paravirtualization (PV) is a lack of flexibility when using PV interfaces. PV is a technique in which a virtual machine does not necessarily simulate hardware, but instead (or in addition) it offers a special application programming interface (API) that can only be used by modifying the guest application. In PV, the guest application is "aware" of the hypervisor, whereas in full virtualization the guest application is not aware of the hypervisor.

A PV interface is an idealized device interface that allows an application in a virtual machine to better access underlying devices. However, in PV, different hypervisors require different device drivers in the virtual machines; these device drivers within the virtual machines are called "front-end device drivers". In order for the application to derive optimum performance from the PV device, the application might need to be modified. If the application is using an operating system API to access the PV device, the API might need to be modified instead. Effectively, therefore, custom modifications are needed inside the guest virtual machine to leverage the high-performance device.

SUMMARY

This summary is provided to introduce in a simplified form certain concepts that are further described in the Detailed Description below. This summary is not intended to identify essential features of the claimed subject matter or to limit the scope of the claimed subject matter.

The technique introduced here includes a high-performance device interface (HPDI) that provides flexible and high-performance access to applications residing in a Virtual Machine (VM) to high-performance devices. The technique enables VM applications to use a single interface even when multiple device drivers exist (i.e., physical device drivers and/or PV device drivers) and can pass data efficiently between a VM application and a front-end device driver. It improves overall performance of a VM by reducing the copying of data (e.g., by using zero-copy data sharing) during communications between a VM application and a front-end device driver, which reduces CPU and memory usage.

In certain embodiments the technique includes the HPDI, which may be an API (or a set of APIs) between one or more VM applications and one or more VM device drivers, as well as associated techniques in which a VM application leverages the HPDI to achieve high performance when communicating with a device.

In certain embodiments, two APIs are made available to a VM application for communicating with a device through the HPDI: Send and Receive. Send is used by the application when it initiates data transfer. For example, when issuing an I/O operation to a disk or other type of storage device, Send can be used to write data to or read data from the storage device. Receive allows a physical device to present data to the VM application asynchronously. For example, the VM application may need to receive networking packets via a network communication adapter at any time, without having requested them. Receive may be used for this purpose.

The HPDI also provides an abstract programming interface for a VM application. Accordingly, rather than having to implement Send and Receive for multiple device drivers, as might otherwise be necessary to obtain optimum performance, the VM application only needs to support the one HPDI. As such, the HPDI is device driver-independent. This means the VM application need not be aware of the specific device driver(s) being used. Essentially, the HPDI provides an abstraction layer that can provide high-performance without the common detrimental side-effects of software layering (data copies, increased latency, etc.); the VM application only needs to communicate with the HPDI.

Moreover, in embodiments associated with virtualization environments that support paravirtualization (PV), the VM application can be made hypervisor-independent, increasing portability and flexibility for application developers. In certain embodiments, therefore, the HPDI operates (logically) on top of a paravirtualized device interface that operates between a hypervisor and a VM, which provides efficient device access to the physical devices.

Other aspects of the technique will be apparent from the accompanying figures and detailed description.

BRIEF DESCRIPTION OF THE DRAWINGS

One or more embodiments of the present invention are illustrated by way of example and not limitation in the figures of the accompanying drawings, in which like references indicate similar elements and in which.

DETAILED DESCRIPTION

Figure 1:
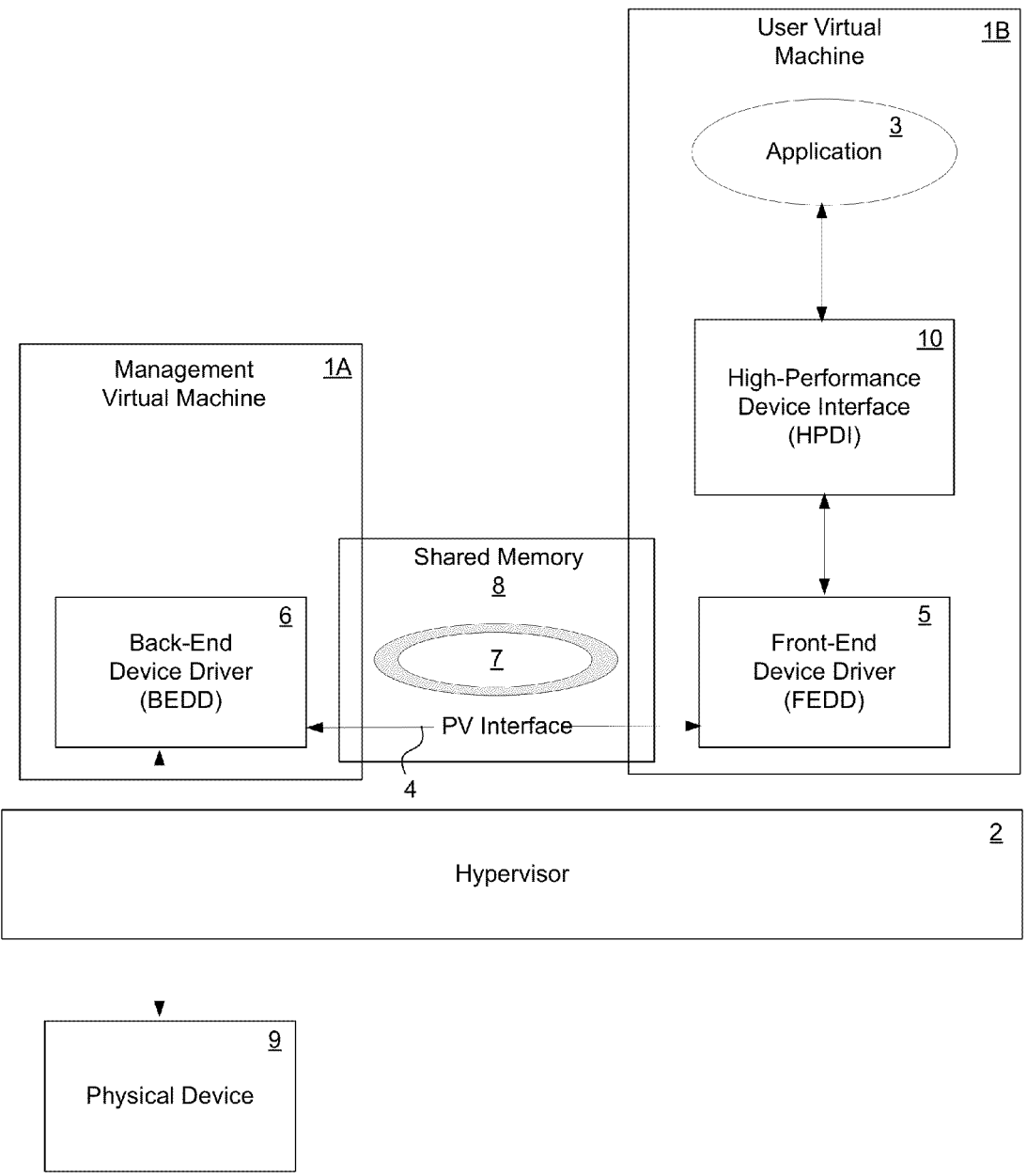
FIG. 1 illustrates a virtualization system in which the high-performance device interface introduced here can be implemented.

FIG. 1 illustrates a system in which the technique introduced here can be implemented, according to one embodiment. The system includes two or more virtual machines 1A, 1B which operate on top of a hypervisor 2 in a physical host system (not shown). The hypervisor 2 may be essentially any conventional hypervisor. At least one of the virtual machines is a user virtual machine 1B, which includes at least one VM application 3 (hereinafter simply "application"). Another one of the virtual machines is a management virtual machine 1A. The management virtual machine 1A boots automatically when the hypervisor 2 boots, and it receives special management privileges and directs access to all physical hardware by default. A system administrator can log into the management virtual machine 1A in order to manage any of the user virtual machines 1B.

In one embodiment, the system implements the Xen® virtualization environment (i.e., using the Xen hypervisor), in which case the management virtual machine 1A may be a Xen domain 0 ("dom0") and each user virtual machine 1B may be a Xen domain U ("domU"). As another example, the virtualization environment could be based on Microsoft® Hyper-V technology.

The illustrated system implements paravirtualization, i.e., there is a paravirtualization (PV) interface 4 which enables communication between management virtual machine 1A and the user virtual machine 1B. Accordingly, the user virtual machine 1B includes a front-end device driver (FEDD) 5, which communicates with a back-end device driver (BEDD) 6 in the management virtual machine 1A via the PV interface 4. In conjunction with the PV interface 4, the system implements a ring-structured memory 7, which is shared between the user virtual machine 1B and the management virtual machine 1A as part of shared memory 8. Note, however, that the technique introduced here does not necessarily have to be implemented with paravirtualization.

An application 3 in a user virtual machine 1B needs to communicate with a physical device 9 within the host system. Accordingly, the technique introduced here provides a high-performance device interface (HPDI) 10 within a user virtual machine 1B to facilitate such communication. Details of the HPDI 10 are discussed below. The purpose and nature of the application 3 are not germane to the technique being introduced here; however, it is noted that one possible embodiment of the application 3 is a data module of a network storage server, as described below.

It is assumed here, only for purposes of facilitating description, that the illustrated system implements paravirtualization similar to that used by Xen and Microsoft Hyper-V. Note that in other embodiments, a different virtualization system/environment may be employed. Note that the terms "domain" and "virtual machine" are used interchangeably in this description. Xen provides several components for inter-domain communication to facilitate paravirtualization: 1) a grant references mechanism; 2) a shared input/output (I/O) ring 7 (FIG. 1); and 3) an Event-Channel mechanism. The grant references mechanism enables explicit sharing of memory pages between domains (virtual machines). Each domain has its own grant table (not shown), and each entry in the grant table is identified by a grant reference, which is an index into the table. A grant reference refers to a shared memory page, which can be passed between domains, i.e., between a user virtual machine and the management virtual machine. The grant reference mechanism is dynamic and provides for two types of page-sharing: read-only and read-write.

The shared I/O ring 7 is a shared bi-directional, producer-consumer ring structure that allows communication between domains, such as virtual machines 1A and 1B. The device drivers use the shared I/O ring 7 to send and receive I/O (requests and responses) across domains. The shared I/O ring 7 is established in a region 8 of memory that is shared between two domains. Therefore, as part of an initial handshake mechanism that takes place between the FEDD 5 and BEDD 6, the grant reference information for the shared memory page is also exchanged.

Notification of requests/responses on the shared I/O ring 7 happens via event-channel interrupts between the two domains. Each ring request corresponds to an unit of I/O between the domains, raw data required for the I/O (read or write) are represented via the corresponding data page's grant reference in the ring request. Thus, all data transfers between the FEDD 5 and BEDD 6 can happen via an efficient, zero-copy (shared memory) mechanism.

The Event-Channels mechanism is an asynchronous event notification mechanism that emulates hardware interrupts to the guest. An Event-Channel module (not shown) can be provided inside each domain, to acquire a physical interrupt request (IRQ) line within the domain and to register that IRQ line with the hypervisor 2. Collaborating modules in the domains (e.g., ScsiFront and ScsiBack) establish an Event-Channel (containing virtual interrupts) between them for future asynchronous notification. The Event-Channel module uses bitmaps for the virtual interrupts in a shared memory page (established during initialization along side the shared I/O ring) between the domains. When a virtual interrupt needs to be sent by a module (e.g., ScsiFront), an Event-Channel API along with the corresponding Event-Channel handle is called. The API sets the appropriate bit in the shared memory region and makes a hypervisor call to generate an interrupt to the peer. The hypervisor knows the physical IRQ line occupied by the Event-Channel module in the peer and triggers that interrupt in the peer. At the receipt of an interrupt, the Event-Channel module checks the bitmap to identify the appropriate virtual interrupt.

In addition to these mechanisms, Xen provides XenStore, a hierarchical management data store, which is mainly used in the control path during the device discovery stage in initialization. The memory pages it uses are shared between domains, such that Dom0 (the management domain) exports a device tree of devices that are available to DomUs (user domains). A DomU will traverse this tree when it desires to run a device.

The domains 1A, 1B can interact with XenStore using, for example, the XenBus API, which is the interface provided by XenBus, the abstract paravirtualization bus of Xen. The XenBus API enables paravirtualized device drivers to receive notifications and information from XenStore and to write data back to it. Therefore, any paravirtualization child device of XenBus has three components to be fully functional: 1) a shared memory page for the I/O ring (the actual ring request contents are specific to the protocol between the front-end and back-end; 2) an Event-Channel for signaling activity on the shared I/O ring; and 3) a XenStore entry for the device containing information about the device.

In one embodiment, the HPDI 10 is an API. Referring still to FIG. 1, the functionality of the HPDI 10 is two-fold: 1) to provide a single interface for VM applications to use even when multiple FEDDs exist in a virtual machine, and 2) to pass data efficiently between a VM application and a FEDD. To that end, the HPDI 10 includes two APIs, Send and Receive, for a VM application to use.

Send is invoked by the application 3 and can be used for storage device I/O or networking I/O. In both cases the application 3 sends a Send request to the HPDI 10, either passing it data or requesting it. Note that even if the application 3 requests data, it is still uses the Send interface. A Send-Callback function is used by the HPDI 10 to communicate a success or error notification back to the application.

Receive allows a physical device 9 to present data to the application 3 asynchronously. For example, the application 3 may need to receive networking packets via a network communication adapter at any time, without having requested them. A Receive-Callback function is used by the HPDI 10 to communicate a success or error notification back to the application 3.

Figure 2:
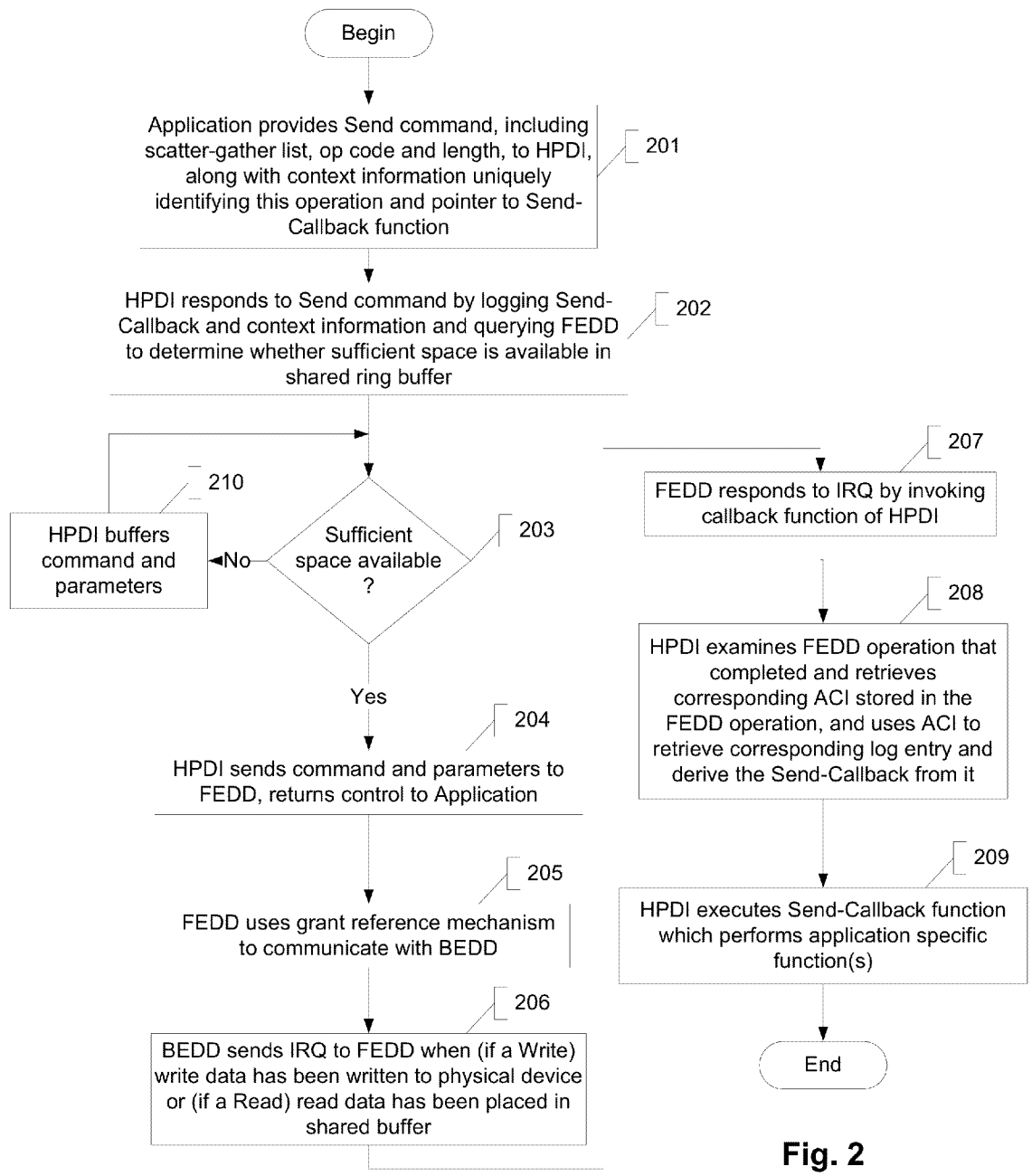
FIG. 2 shows an example of a sequence of operations represented by the Send API.

FIG. 2 shows an example of a sequence of operations represented by the Send API. As noted, Send may be used either to write data to a device or to read data from a device. Initially, at step 201 the application 3 provides to the HPDI 10 a Send command, which in one embodiment includes as parameters a scatter-gather list, an operation code ("opcode"), a length value, context information and a pointer to the Send-Callback function. Note that the application 3 simply shares the list of addresses for the FEDD 5 to use. The application 3 has already reserved space for this data.

The opcode indicates whether this particular instance (invocation) of the Send function is to perform a read or a write. In the case of a write, the scatter-gather list indicates the source memory locations where the data to be written resides; in the case of a read, it includes the destination memory locations to which the read data are to be written. Note that in another embodiment, a simple pointer to a memory region could be used instead of a scatter-gather list. The length value indicates the length of the data to be written or read. The context information can be any information that uniquely identifies this particular invocation of the Send function (to distinguish it from other instances of the Send function). The context information can be in the form of, for example, a pointer to a unique context structure, called application-specific context information (ACI), that describes the operation. Each operation from the application corresponds to one or many operations of the FEDD. In each such FEDD operation, the corresponding ACI is stored.

Next, at step 202 the HPDI 10 responds to Send command by creating an internal log entry for this operation, which includes the pointer to the Send-Callback function and the ACI. The HPDI 10 also queries the FEDD 5 to determine whether sufficient space is available in the shared ring buffer 7. If sufficient space is not available, then the HPDI 10 buffers the command and parameters (step 210) until sufficient space is available.

When sufficient space is available in the shared ring buffer 7, at step 204 the HPDI 10 sends the command and its parameters to the FEDD 5 and then returns control to the application 3. Next, at step 205 the FEDD 5 uses the above-described grant reference mechanism to communicate with the BEDD 6 in the management virtual machine (using the PV interface 4). In the case of a write operation, this communication involves sending the data to be written to the BEDD 6. In the case of a read operation, it involves sending the pointers to the memory pages that have been pre-allocated by the application to receive data from the device.

At step 206, the BEDD 6 sends an IRQ to the FEDD 5 when (in the case of a write) the data has been successfully written to the physical device 9 or (in the case of a read) the data has been placed by the BEDD 6 into the shared ring buffer 7. The FEDD 5 responds to the IRQ at 207 by invoking a callback function in the HPDI 10 ("HPDI callback"; this is separate from the Send-Callback that the application 3 previously registered with the HPDI 10). At step 208, inside the HPDI callback, the HPDI 10 examines the FEDD operation that completed and retrieves the corresponding ACI that was stored in the FEDD operation. The HPDI 10 uses that ACI to retrieve the corresponding log entry and derives the Send-Callback function from it. Finally, at step 209, the HPDI 10 executes the Send-Callback function which performs application specific function(s), which includes or refers to the appropriate ACI for this invocation of the Send function. In the case of read, the notification will also include the read data or a pointer to the read data.

Note that for explicit read devices (devices where the exact location to be read and the buffers into which the data is to be read into are specified a prion), the Send function of the HPDI 10 enables both writing and reading data from the device. SCSI devices are a common example of this type of device. Other disk and block devices follow a similar model.

For non-explicit read devices (devices where data is received at any point in time asynchronously by the device), the VM application need not make an explicit read to receive data from the device. Network devices are examples of non-explicit read devices. Network packets containing data in general can be received at any time on any interface for any application. Further processing is performed on the packet to assign it to the right application. In at least some embodiments, only non-explicit read devices use the Receive function of HPDI.

Figure 3A:
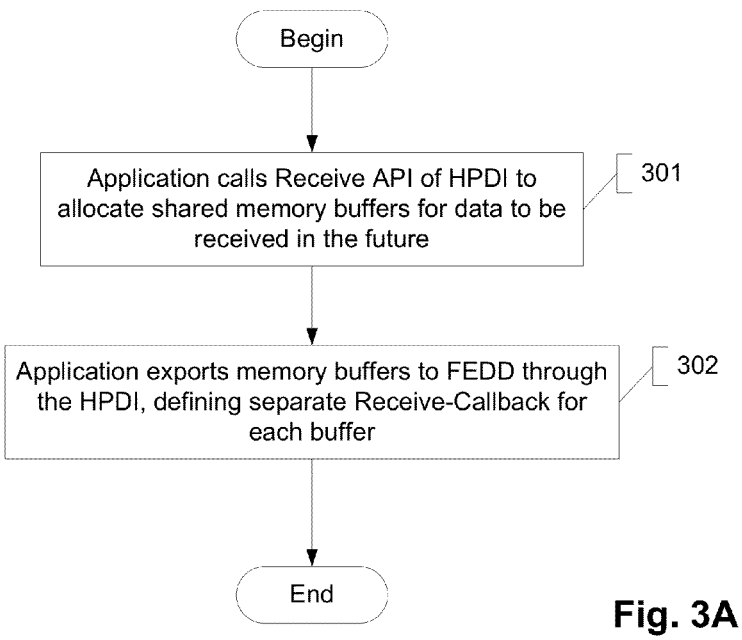
FIGS. 3A and 3B collectively show an example of a sequence of operations represented by the Receive API.
Figure 3B:
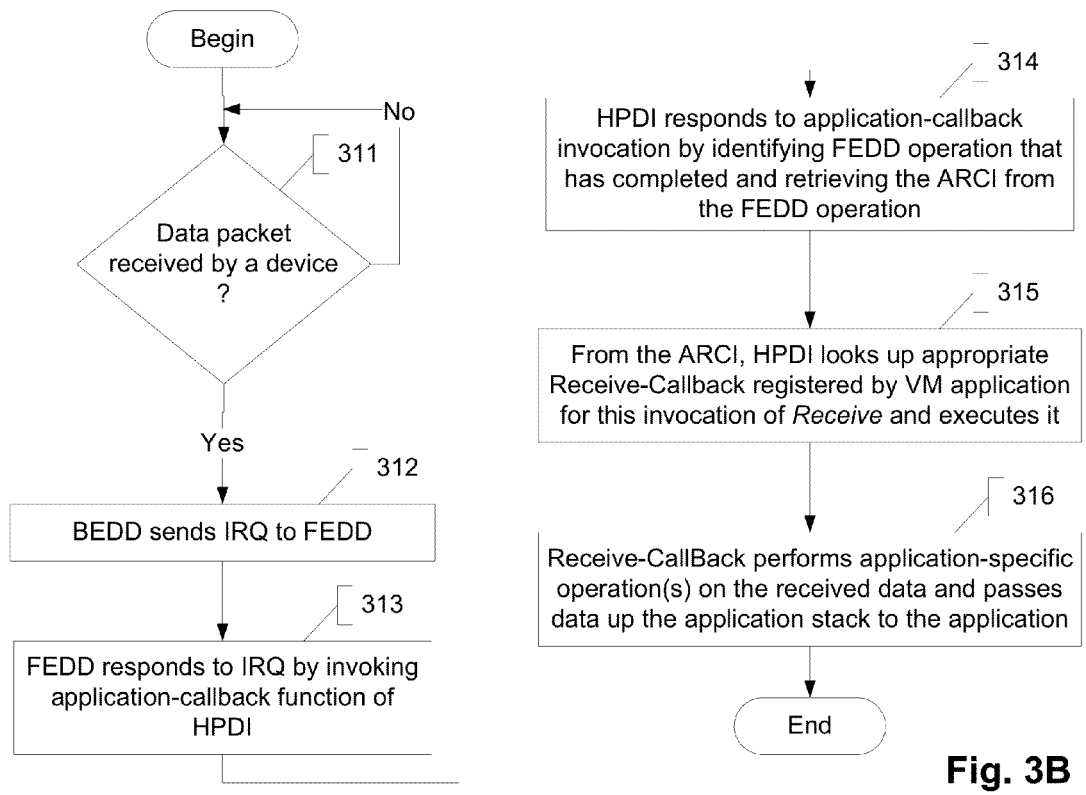

FIGS. 3A and 3B illustrate an example of processes for implementing the Receive API. The process of FIG. 3A is performed by the application 3 as a preliminary setup/configuration process, whereas the process of FIG. 3B is performed during runtime. Referring first to FIG. 3A, in step 301 the application 3 calls the Receive API of the HPDI 10.

For non-explicit-read devices such as network devices, a network packet could be received asynchronously for the VM application at any point in time. The Receive API of the HPDI 10 is provided to accommodate such devices. Using this API, the VM application 3 pre-allocates memory buffers and passes them to the HPDI 10. In a PV environment, the HPDI 10 can share the memory buffers with the BEDD 6 via the FEDD 5. As network packets are received for the VM application 3, the BEDD 6 deposits network packets obtained from the device directly into these buffers. Thus, data is available to the VM application 6 without further copies being required along the path.

For each Receive invocation, along with the receive buffer, application-specific receive context information (ARCI) is allocated by the application and shared with the HDPI 10. In addition, for each invocation, a Receive-CallBack function is provided to the HDPI 10. The HDPI 10 will execute the Receive-CallBack when data is placed into the specific receive buffer (step 302).

In one embodiment for PV environments, for each receive buffer passed to HDPI 10 via the Receive API, the HDPI 10 creates an appropriate FEDD operation to share the buffer with BEDD 6 and queues it on the shared PV ring infrastructure 7 for the BEDD 6 to pick up. The corresponding ARCI information is stored in the FEDD operation. As can be seen, this model provides end-to-end zero-copy between the physical device 9 (via BEDD 6, followed by FEDD 5) to the VM application 3.

Referring now to FIG. 3B, when a data packet is subsequently received by a physical device 9 (e.g., by a network adapter, over a network) at step 311, the BEDD 6 at step 312 has already placed the data into one of the previously allocated shared buffers and sends an IRQ to the FEDD 5. At step 313, the FEDD 5 responds to the IRQ by invoking an internal callback function of HPDI 10. Inside the callback, at step 314 the HPDI 10 identifies the FEDD operation that has completed and retrieves the ARCI from the FEDD operation. From the ARCI, at step 315 the HPDI 10 is able to lookup the appropriate Receive-Callback routine registered by the VM application 3 for this invocation of the Receive operation and executes it. The Receive-CallBack performs one or more application-specific operations on the received data and passes the data up the application stack at step 316. This process is repeated for all received packets.

Note that the pool of receive buffers provided to the HDPI 10 get depleted as new packets are received from the BEDD 6. Therefore, as packets are received, new receive buffers need to be shared afresh with the HDPI 10 by using more invocations of the Receive API.

Figure 4:
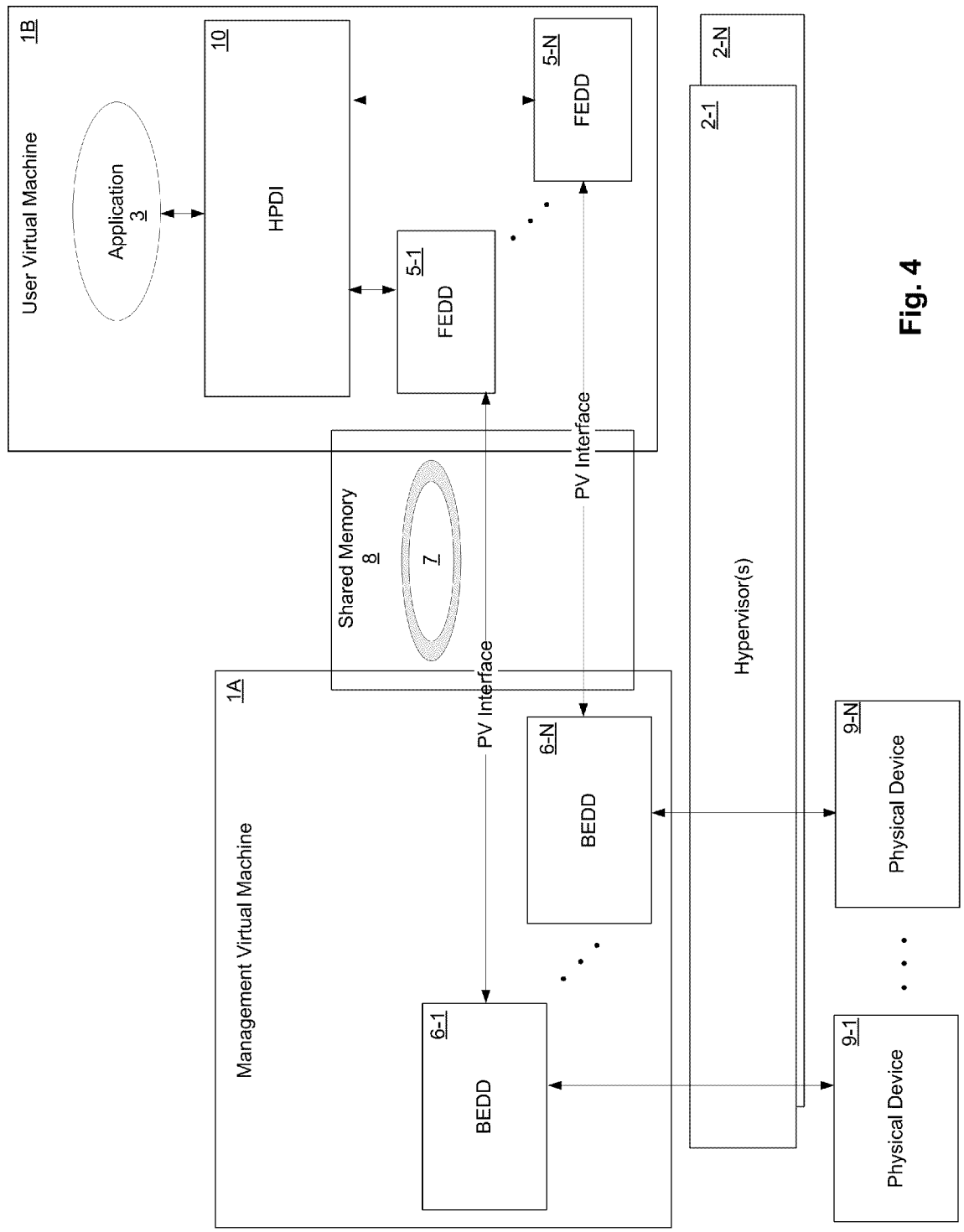
FIG. 4 illustrates a virtualization system in which the high-performance device interface enables an application to access multiple different device drivers.

The above-described HPDI 10 can function as a single interface by which one or more applications can communicate with multiple device drivers in a given virtual machine. This scenario is illustrated in FIG. 4. In FIG. 4, the HPDI 10 provides an application 3 (or multiple applications) with access to multiple paravirtualized FEDDs 5-1 through 5-N in the user virtual machine 1B. The multiple FEDDs 5-1 through 5-N may be of different types, and may correspond to different hypervisors 2-1 through 2-N. Alternatively, or additionally, the multiple FEDDs 5-1 through 5-N may correspond to multiple different BEDDs 6-1 through 6-N in the management virtual machine. These BEDDs, in turn, may be used to access different physical devices 9-1 through 9-N, as shown, which may be of different types.

Figure 5A:
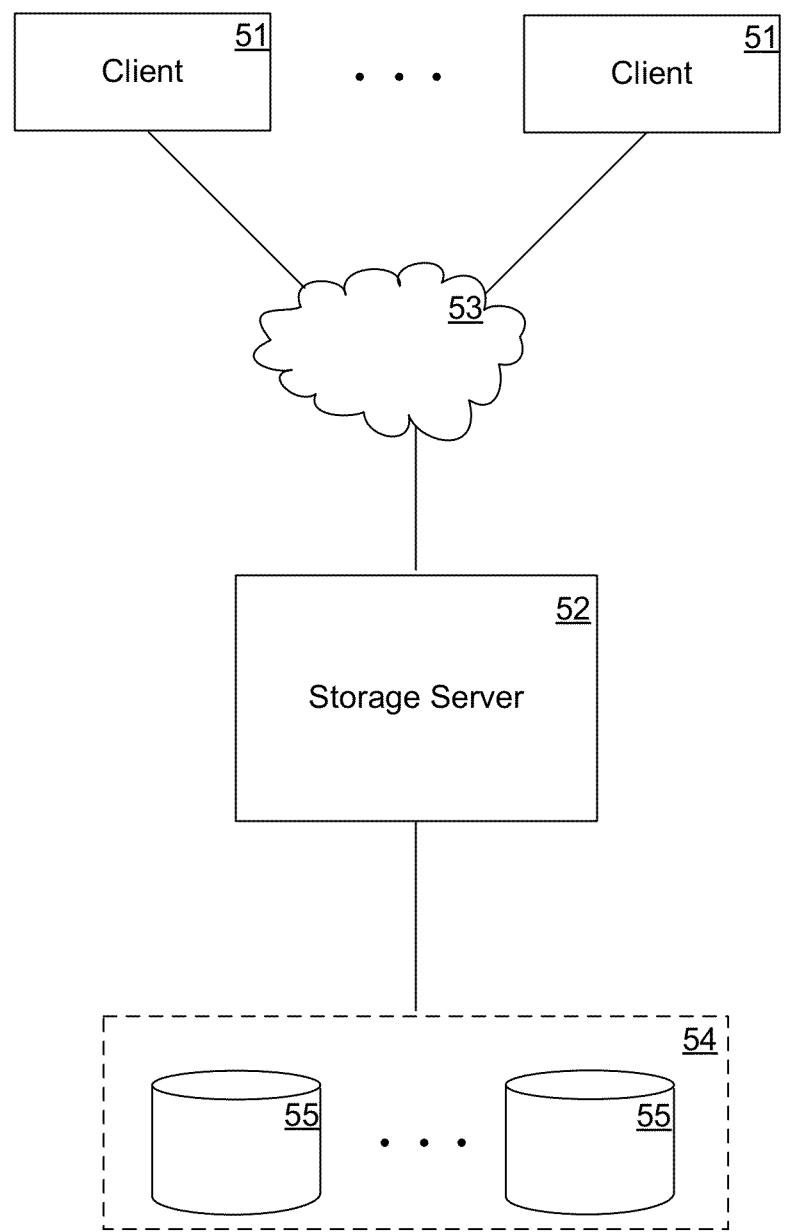
FIG. 5A illustrates an example of a network storage system.

The above-described technique can be implemented in many different processing environments. One example of such an environment is a network storage system such as illustrated in FIG. 5A. In FIG. 5A, a network storage server 52 is coupled to a storage subsystem 54 that includes non-volatile mass storage devices 55, and to a set of clients 51 through an interconnect 53. The interconnect 53 may be, for example, a local area network (LAN), wide area network (WAN), metropolitan area network (MAN), global area network such as the Internet, a Fibre Channel fabric, or any combination of such interconnects. Each of the clients 51 may be, for example, a conventional personal computer (PC), server-class computer, workstation, handheld computing/communication device, or the like.

The storage server 52 manages storage of data in the storage subsystem 54 on behalf of the clients 51. For example, the storage server 52 receives and responds to various read and write requests from the clients 51, directed to data stored in or to be stored in the storage subsystem 54. The mass storage devices 55 in the storage subsystem 54 can be, for example, conventional magnetic or optical disks or tape drives; alternatively, they can be non-volatile solid-state memory, such as flash memory or solid-state drives (SSDs), or a combination of the aforementioned types of devices. The mass storage devices 55 can be organized as a Redundant Array of Inexpensive Devices (RAID), in which case the storage server 52 accesses the storage subsystem 54 using one or more well-known RAID protocols. The storage server 52 may include a storage operating system (not shown), i.e., a functional module which controls most of the operations of the storage server 52, including servicing client initiated data access requests.

Figure 5B:
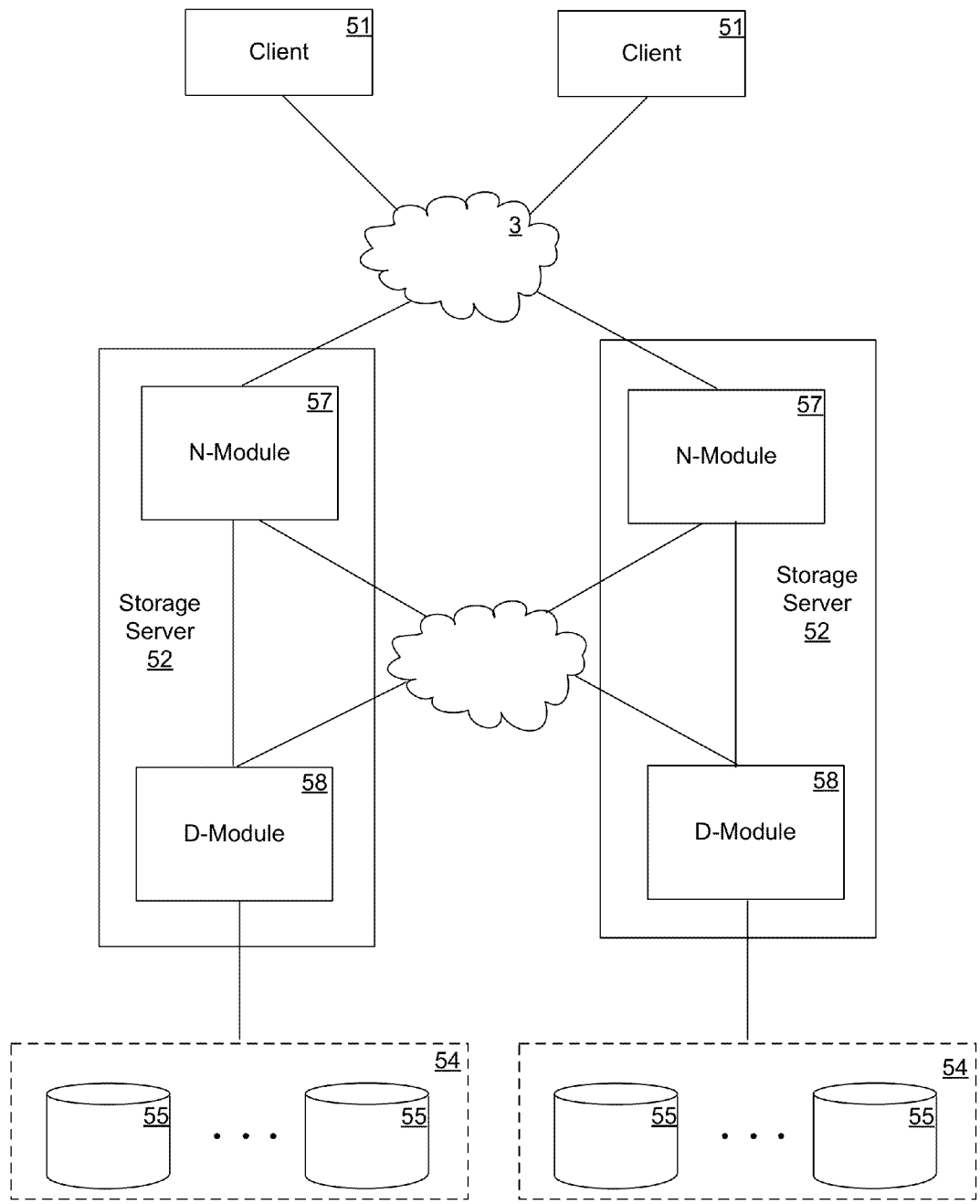
FIG. 5B illustrates an example of a network storage system which includes a storage server that has a distributed architecture.

The storage server 52 may be a file-level server such as used in a NAS environment, a block-level storage server such as used in a SAN environment, or it may be capable of providing both file-level and block-level data access. Further, although the storage server 52 is illustrated as a single unit in FIG. 5A, it can have a distributed architecture, such as shown in FIG. 5B. For example, a storage server 52 can include a physically separate network module (e.g., "N-module") 57 and data module (e.g., "D-module") 58, which may communicate with each other over an external interconnect 59. To control and perform the above-described operations, a storage server 52 may contain a storage operating system, of which the N-module 57 and D-module 58 may be components.

Figure 6:
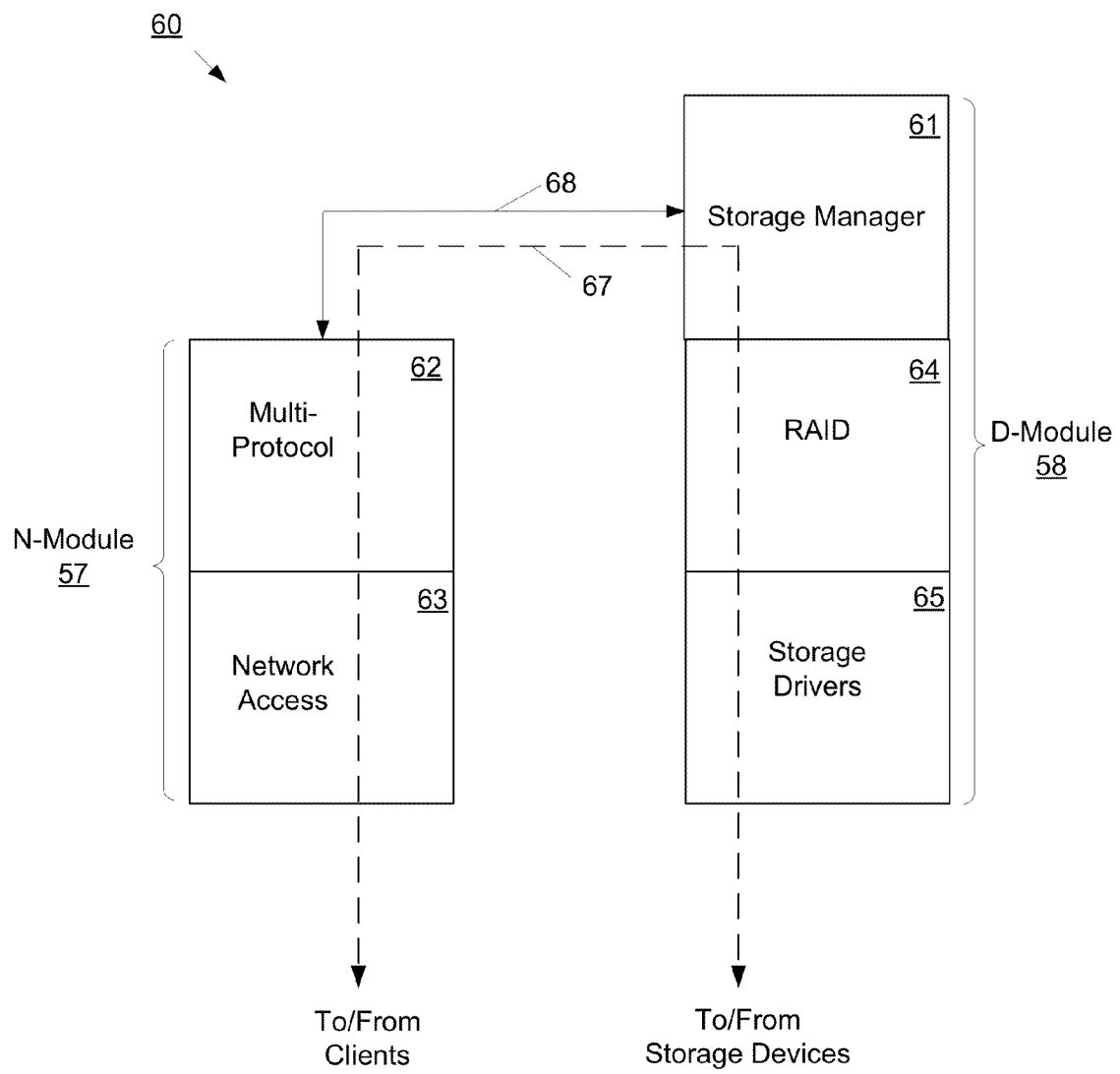
FIG. 6 illustrates an example of a storage operating system such as may be used in a network storage server.

A storage server 52 can be implemented as virtual storage server, for example, as a user virtual machine in a virtualization environment such as described above. In that case, an application within such user virtual machine may be, for example, the storage operating system of a storage server, or one or more elements of the storage operating system. FIG. 6 illustrates an example of such a storage operating system.

In the embodiment shown in FIG. 6, the storage operating system 60 includes several modules, or "layers". These layers include a storage manager 61, which is the core functional element of the storage operating system 60. The storage manager 61 imposes a structure (e.g., a hierarchy) on the data stored by the storage server 52, and services read and write requests from clients.

To allow the storage server 52 to communicate over a network (e.g., with clients), the storage operating system 60 also includes a multiprotocol layer 62 and a network access layer 63, which operate logically "under" the storage manager 61. The multiprotocol 62 layer implements various higher-level network protocols, such as Network File System (NFS), Common Internet File System (CIFS), Hypertext Transfer Protocol (HTTP), Internet small computer system interface (iSCSI), and/or backup/mirroring protocols. The network access layer 63 includes one or more network drivers that implement one or more lower-level protocols to communicate over the network, such as Ethernet, Internet Protocol (IP), Transport Control Protocol/Internet Protocol (TCP/IP), Fibre Channel Protocol (FCP) and/or User Datagram Protocol/Internet Protocol (UDP/IP).

To allow the storage server 52 to communicate with a local storage subsystem, the storage operating system 60 includes a RAID layer 64 and an associated storage driver layer 65 logically under the storage manager 61. The RAID layer 64 implements a higher-level RAID algorithm, such as RAID-0, RAID-1, RAID-4, RAID-5 or RAID-6. The storage driver layer 65 implements a lower-level storage device access protocol, such as Fibre Channel Protocol (FCP) or small computer system interface (SCSI). Also shown is the data path 67 between the clients and storage devices.

In the illustrated embodiment, the storage manager, 61, the RAID layer 64 and the storage drivers 65 are functionally grouped into a set of code and/or circuitry, i.e., a D-module 58, which is responsible for data management functions; whereas the multiprotocol layer 62 and the network access layer 63 are functionally grouped into a separate set of code and/or circuitry, i.e., the N-module 57, which is responsible for network communications. In this embodiment, the N-module 57 and the D-module 58 communicate through a special-purpose communication link and protocol 68.

In certain embodiments, the above-mentioned application 3 is the D-module 58 of a storage operating system 60 of a virtual network storage server such as described above. In other embodiments, the application 3 is the RAID module 64 of a storage operating system. In still other embodiments, the application 3 is one or more other components of the storage operating system, or it is the entire storage operating system. In still further embodiments, the application 3 is a completely different type of application.

Figure 7:
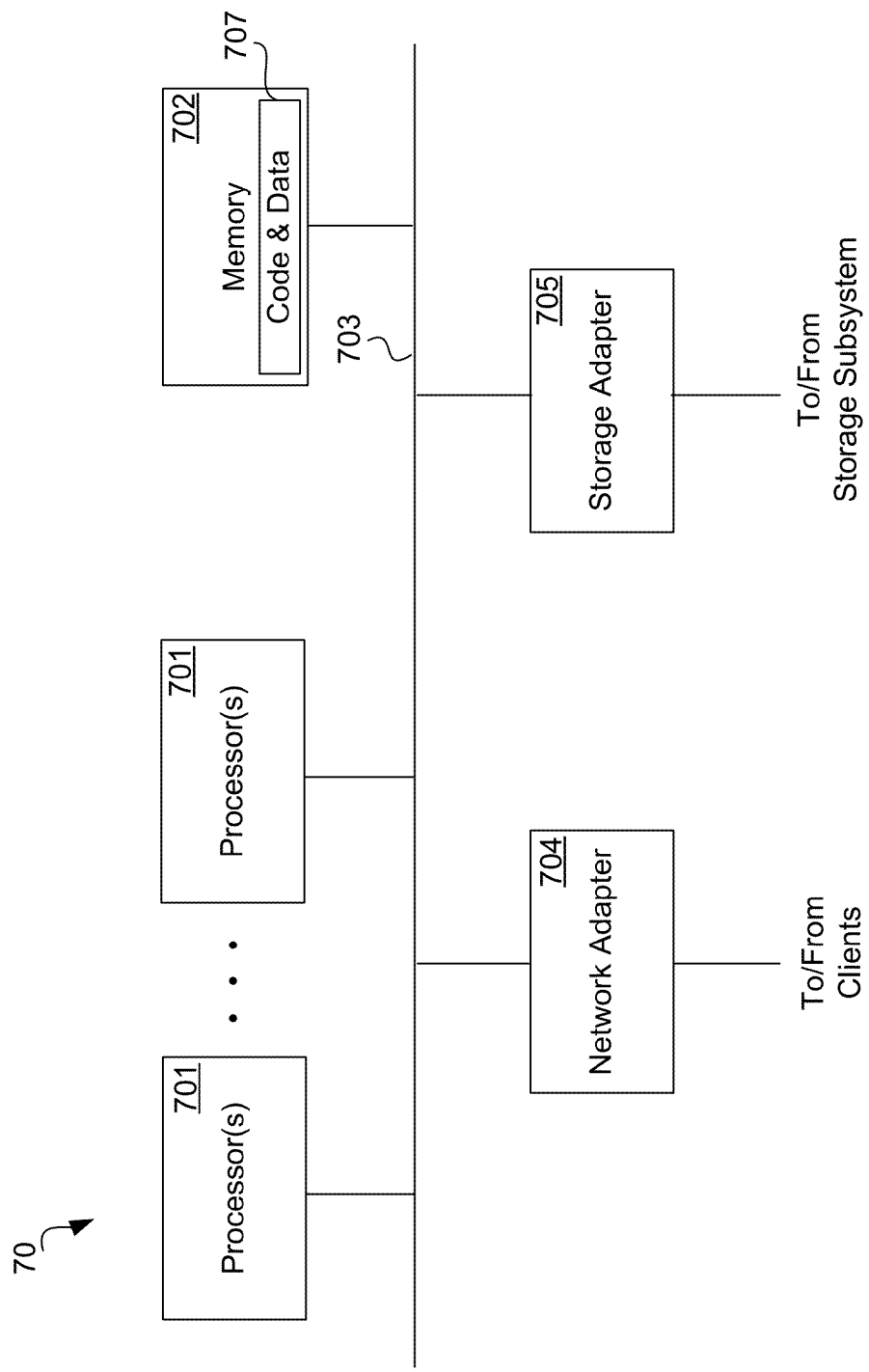
FIG. 7 is a high-level block diagram of a processing system in which a virtualization environment such as described herein can be implemented.

FIG. 7 is a high-level block diagram showing the hardware architecture of a processing system that can implement one or more virtual machines, such as described above, for example, a processing system that can implement one or more virtual storage servers. The processing system 70 in the illustrated embodiment includes multiple processors 71 and memory 72, each coupled to an interconnect 73. The interconnect 73 is an abstraction that represents any one or more separate physical buses, point-to-point connections, or both connected by appropriate bridges, adapters, or controllers. The interconnect 73, therefore, may include, for example, a system bus, a Peripheral Component Interconnect (PCI) bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, sometimes referred to as "Firewire".

The processors 71 may be or include the CPUs of the processing system 70 and, thus, control the overall operation of the processing system 70. In certain embodiments, the processor(s) 71 accomplish this by executing software or firmware stored in memory, such as memory 72. Each processor 71 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

The memory 72 is or includes the main memory (working memory) of the processing system 70. The memory 72 represents any form of random access memory (RAM), read-only memory (ROM), flash memory (as discussed above), or the like, or a combination of such devices. In use, the memory 72 may contain, among other things, software and/or firmware code and data 77 for use in implementing a virtualization environment, one or more virtual machines, and the HPDI 10 described above.

Also connected to the processors 71 through the interconnect 73 are a network adapter 74 and a storage adapter 75. The network adapter 74 provides the processing system 70 with the ability to communicate with remote devices, such as clients, over a network and may be, for example, an Ethernet adapter or Fibre Channel adapter. The storage adapter 75 allows the processing system 70 to access its associated storage subsystem and may be, for example, a Fibre Channel adapter or a SCSI adapter.

The techniques introduced above can be implemented by programmable circuitry programmed/configured by software and/or firmware, or entirely by special-purpose circuitry, or by a combination of such forms. Such special-purpose circuitry (if any) can be in the form of, for example, one or more application-specific integrated circuits (ASICs), programmable logic devices (PLDs), field-programmable gate arrays (FPGAs), etc.

Software and/or firmware to implement the techniques introduced here may be stored on a machine-readable storage medium and may be executed by one or more general-purpose or special-purpose programmable microprocessors. A "machine-readable medium", as the term is used herein, includes any mechanism that can store information in a form accessible by a machine (a machine may be, for example, a computer, network device, cellular phone, personal digital assistant (PDA), manufacturing tool, any device with one or more processors, etc.). For example, a machine-accessible medium includes recordable/non-recordable media (e.g., read-only memory (ROM); random access memory (RAM); magnetic disk storage media; optical storage media; flash memory devices; etc.), etc.

The techniques introduced above can be implemented by programmable circuitry programmed/configured by software and/or firmware, or entirely by special-purpose circuitry, or by a combination of such forms. Such special-purpose circuitry (if any) can be in the form of, for example, one or more application-specific integrated circuits (ASICs), programmable logic devices (PLDs), field-programmable gate arrays (FPGAs), etc.

Software or firmware to implement the techniques introduced here may be stored on a machine-readable storage medium and may be executed by one or more general-purpose or special-purpose programmable microprocessors. A "machine-readable medium," as the term is used herein, includes any mechanism that can store information in a form accessible by a machine (a machine may be, for example, a computer, network device, cellular phone, personal digital assistant (PDA), manufacturing tool, any device with one or more processors, etc.). For example, a machine-accessible medium includes recordable/non-recordable media (e.g., read-only memory (ROM); random access memory (RAM); magnetic disk storage media; optical storage media; flash memory devices; etc.), etc.

References in this specification to "an embodiment," "one embodiment," or the like, mean that the particular feature, structure or characteristic being described is included in at least one embodiment of the present invention. Occurrences of such phrases in this specification do not necessarily all refer to the same embodiment. On the other hand, different embodiments may not be mutually exclusive either.

Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

What is claimed is:

1. A processor-based system comprising:
   a virtual machine stored on a computer-readable storage medium operable to communicate with a hypervisor when executed by a processor, the virtual machine including:
      a front-end device driver to provide access to a physical device when executed by a processor;
      an application which requires access to the physical device when executed by a processor; and
      an interface to facilitate communication between the application and the front-end device driver by using zero-copy data sharing when executed by a processor, wherein the interface is front-end device driver-independent.

2. A processor-based system as recited in claim 1, wherein the virtual machine further comprising:
   a second front-end device driver to provide access to a second physical device when executed by a processor;
   wherein the interface further is to facilitate communication between the application and the second front-end device driver by using zero-copy data sharing.

3. A processor-based system as recited in claim 1, wherein the interface comprises an application programming interface (API).

4. A processor-based system as recited in claim 1, wherein the interface is operable to facilitate communication between the application and the front-end device driver and wherein the front-end device driver is paravirtualized.

5. A processor-based system as recited in claim 1, wherein the interface is operable to facilitate asynchronous communication between the application and the front-end device driver.

6. A processor-based system as recited in claim 1, wherein the interface implements a set of commands for communicating between the application and the front-end device driver, the set of commands including:
   a first command for use by the application to enable the application to send data to the physical device and to enable the application to receive data from the physical device; and
   a second command to allow the application to receive data asynchronously from a physical device.

7. A processor-based system as recited in claim 1, further comprising:
   a management virtual machine operable to communicate with the hypervisor when executed by a processor, the management virtual machine including a back-end device driver to provide access to the physical device, wherein the front-end device driver and the back-end device driver are operable to communicate by use of a paravirtualized interface.

8. A processor-based system as recited in claim 1, wherein the physical device comprises at least one from the list consisting of:
   a mass storage device; and
   a network communication device.

9. A processor-based system as recited in claim 1, wherein the application comprises at least one from the list consisting of:
   a storage manager; and
   a RAID module.

10. A processor-based system as recited in claim 1, wherein:
    the physical device comprises at least one from the list consisting of:
       a mass storage device, and
       a network communication device; and
    the application comprises at least one from the list consisting of:
       a storage manager, and
       a RAID module.

11. A processor-based system as recited in claim 1, wherein the virtual machine comprises a storage manager module of a network storage server.

12. A processor-based system as recited in claim 1, wherein the front-end device driver is one of a plurality of front-end device drivers of different types in the virtual machine, and wherein the interface facilitates communication between the application and each of the plurality of front-end device drivers.

13. A network storage server comprising:
    a processor;
    a hypervisor executable by the processor;
    a management virtual machine operable to communicate with the hypervisor, the management virtual machine including a back-end device driver to provide access to a physical device; and
    a user virtual machine operable to communicate with the hypervisor, the user virtual machine including
       a paravirtualized front-end device driver to provide access to the physical device via the back-end device driver by using a paravirtualized interface;
       a data module including a storage manager of the network storage server; and
       an application driver interface which is front-end device driver-independent and implements a set of commands for communicating between the data module and the paravirtualized front-end device driver by using zero-copy data sharing.

14. A network storage server as recited in claim 13, wherein the user virtual machine further comprises:
    a second front-end device driver to provide access to a second physical device; and
    wherein the application driver interface further facilitates communication between the data module and the second front-end device driver by using zero-copy data sharing.

15. A network storage server as recited in claim 13, wherein the set of command comprises:
    a first command for use by the data module to enable the data module to send data from the data module to the physical device and to enable the data module to receive data from the physical device; and
    a second command to allow the data module to receive data asynchronously from a physical device.

16. A network storage server as recited in claim 13, wherein the application driver interface comprises an application programming interface (API).

17. A network storage server as recited in claim 13, wherein the application driver interface is operable to facilitate asynchronous communication between the data module and the paravirtualized front-end device driver.

18. A network storage server as recited in claim 13, wherein the physical device comprises at least one from the list consisting of:
    a mass storage device; and
    a network communication device.

19. A network storage server as recited in claim 13, wherein the data module includes a RAID module.

20. A network storage server as recited in claim 13, wherein the paravirtualized front-end device driver is one of a plurality of paravirtualized front-end device drivers of different types in the user virtual machine, and wherein the application driver interface is usable for communication between the data module and each of the plurality of paravirtualized front-end device drivers.

21. A method comprising:
providing an interface, which is device driver independent, to facilitate communication between an application in a virtual machine and a device driver in the virtual machine, including
using a first instance of a first command to enable the application to send data from the application to a physical device via the device driver by using zero-copy data sharing between the application and the device driver; and
using a second instance of the first command to enable the application to receive data from the physical device via the device driver by using zero-copy data sharing between the application and the device driver.

22. A method as recited in claim 21, further comprising:
providing the interface to facilitate communication between the application in the virtual machine and a second device driver in the virtual machine, including:
using a third instance of the first command to enable the application to send data from the application to a second physical device via the second device driver by using zero-copy data sharing between the application and the second device driver; and
using a fourth instance of the first command to enable the application to receive data from the second physical device via the second device driver by using zero-copy data sharing between the application and the second device driver.

23. A method as recited in claim 21, wherein using the first instance of the first command comprises:
the application passing to the interface a list of addresses to share and context information for a callback; and
the interface receiving the callback from the device driver and, in response thereto, notifying the application of the callback.

24. A method as recited in claim 21, further comprising:
using a second command to allow the application to receive data asynchronously from the physical device.

25. A method as recited in claim 24, wherein using the second command comprises:
the application pre-allocating a set of buffers and exporting the set of buffers to the device driver;
the interface receiving a callback from the device driver when a data packet is made available to the interface in a shared memory, and in response thereto, the interface notifying the application of the callback; and
the interface passing the data packet to the application.

26. A method as recited in claim 21, wherein the interface is operable to facilitate communication between the application and a paravirtualized front-end device driver.

27. A method as recited in claim 21, wherein the physical device comprises at least one from the list consisting of:
a mass storage device; and
a network communication device.

28. A method as recited in claim 21, wherein the application comprises at least one from the list consisting of:
a storage manager; and
a RAID module.

29. A method as recited in claim 21, wherein the physical device comprises at least one from the list consisting of:
a mass storage device, and
a network communication device;
and wherein the application comprises a data module of a network storage server.

30. A method as recited in claim 21, further comprising using the interface for communication between the application and a second device driver in the virtual machine.

* * * * *